March 11, 1958   C. J. WHEELER   2,825,967
APPARATUS FOR SEVERING CAST IRON PIPE AND THE LIKE
Filed Nov. 9, 1956

INVENTOR
CHARLES J. WHEELER
BY C.T.Cross
ATTORNEY

United States Patent Office 2,825,967
Patented Mar. 11, 1958

2,825,967

APPARATUS FOR SEVERING CAST IRON PIPE AND THE LIKE

Charles J. Wheeler, Mentor, Ohio, assignor to Wheeler Manufacturing Corporation, Ashtabula, Ohio, a corporation of Ohio Application November 9, 1956, Serial No. 621,360

7 Claims. (Cl. 30—92)

This invention relates to the cutting of hollow articles, and more particularly relates to new and improved readily adjustable apparatus for cutting cylindrical or tubular articles.

This is a continuation-in-part of my application Ser. No. 578,208, filed April 16, 1956.

Up to the present time, the cutting of hollow articles, especially cylindrical or tubular articles such as various types of conduits or pipes, notably cast iron pipe, frequently has been a difficult and time-consuming operation. Cast iron pipe of varying sizes and wall thicknesses is typical of a hollow article which has heretofore been especially difficult to cut quickly and accurately. For that reason, cast iron pipe is particularly referred to throughout the specification and claims although it is to be understood that the practice of this invention, while especially advantageous in the cutting of cast iron pipe is not limited thereto.

Cutting of cast iron pipe heretofore has generally involved the use of hack saws, cold chisels and/or cutting apparatus rotatable or oscillatable about the pipe to effect cutting thereof. While, in some instances, these prior techniques may be satisfactory, certain difficulties generally characterize each of these procedures which render their use disadvantageous in many applications. The use of metal cutting torches also has been employed but there are limitations, too, in the use of such a technique.

The use of both manually operated and power hack saws, while affording means of cutting pipe accurately, generally is slow and relatively costly since the saw blade life often is relatively short. Moreover, it will be appreciated that, at times, the use of a power hack saw is either impracticable or impossible. Moreover, where pipe installation is being carried out in construction work, serious space limitations occasionally are encountered which render the use of any type saw difficult. The use of chisels in the cutting of pipe frequently leads to relatively inaccurate and slow cutting. In addition, as with the use of saws, space limitations at times also impose restrictions on the use of chisels or other similar cutting devices.

Perhaps one of the most common types of pipe cutter employed up to this time has been one embodying a device adapted to be rotated or oscillated about the pipe during the cutting operation. While such devices offer certain advantages over other prior means of cutting pipe, these rotatable or oscillatable cutters have not provided a completely satisfactory solution to the problem of accurately and quickly cutting pipe, especially under conditions where cutting cost and space limitations are additional factors to be considered.

While the invention described and claimed in my above-mentioned application comprises a highly advantageous apparatus and method, and represents a singular advance over the prior art, the present invention represents an improvement thereover which provides a more rapid and simple control and ready adjustment of the compound leverage pressure clamp to facilitate cutting articles of varying sizes.

Accordingly, the principal object of this invention is to avoid the difficulties heretofore encountered and to provide a new and improved method and readily adjustable apparatus for cutting pipe or other hollow articles of varying sizes.

A further object of the invention is the provision of new and improved adjustable apparatus for cutting hollow articles, notably cast iron pipe.

A still further object of the invention is to provide new and hand operable, adjustable apparatus for quickly and accurately cutting pipe.

These and other objects and advantages of the invention will more fully appear from the following description thereof.

Apparatus of this invention adapted to cut a hollow article generally includes at least one cutter having a cutting edge adapted, while substantially stationary with respect to the article, to exert radially-directed, article-cutting pressure and readily adjustable means to apply pressure to said cutting edge. A preferred embodiment contemplates adjustable apparatus which is adapted to provide circumferentially uniform radial article-cutting pressure at a plurality of uniformly spaced points on said article, i. e., around the circumference of the article where cutting is desired.

A more specifically preferred embodiment of apparatus of this invention utilizes a plurality of cutters connected into a non-extensible linkage adapted to surround the article to be cut and while stationary with respect thereto to apply, via a readily adjustable compound leverage pressure clamp more fully described hereinafter, uniformly circumferentially distributed, radially-directed pressure sufficient to cut the article, e. g., four inch diameter cast iron pipe, without rotation or oscillation of the apparatus about the article.

Briefly, the present invention specifically contemplates cutter apparatus comprising a non-extensible linkage including a plurality of spaced cutters and a readily-adjustable compound leverage pressure clamp having one first clamp jaw secured to one end of the linkage and a second clamp jaw adapted to engage the linkage at a point dictated by the size of the article to be cut, the second jaw being pivotally, yet rigidly, secured in an inclined slot in a power lever extension element longitudinally adjustable in response to rotation of the power lever, thereby to permit ready and simple adjustment of the clamp jaw spacing to facilitate cutting of articles of varying sizes.

Referring to the accompanying drawing.

Figure 1:
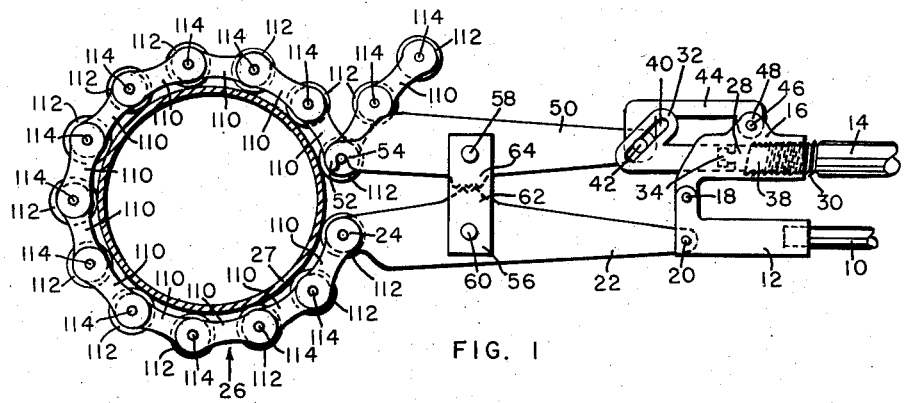
Fig. 1 is a fragmentary view of apparatus of this invention.
Figure 2:
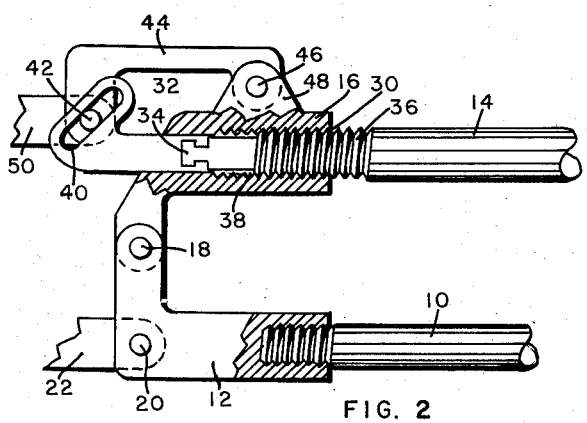
Fig. 2 is an enlarged fragmentary view, partially in section, of a portion of the apparatus of Fig. 1.

Referring more specifically to the drawing as shown in Figs. 1 and 2, the apparatus of the invention comprises, in combination, a first power lever 10 fixedly secured to a first L-shaped member 12, a second power lever 14 rotatably and threadedly engaged in a second L-shaped member 16, said L-shaped members 12 and 16 being pivotally joined at a first common pivot 18. Pivotally secured to the first L-shaped member 12 at pivot 20 at one end is a first rigid clamp jaw 22. At its opposite end, jaw 22 is pivotally connected via pivotal connection 24 to a non-extensible cutter linkage designated generally at 26 and described more fully hereinafter.

L-shaped element 16 is provided with a longitudinal opening 28, threaded for a portion of its length, to permit threaded engagement therein with a threaded portion indicated at 30 of power lever 14, and also containing a non-rotating slotted element 32 secured to the end of the rotatable power lever 14 via a rotatable locking connection at 34 permitting power arm 14 to turn in L-shaped element 16 without becoming disengaged from element 32 while transmitting to element 32 longitudinal movement in response to the progressing threaded engagement or disengagement of external threads 36 on power arm 14 with internal threads 38 when the power arm 14 is rotated or oscillated about its longitudinal axis.

Element 32 is provided with a slot 40 disposed at an acute angle with respect to the longitudinal axis of the power lever 14, in which slot coincide in a common pivotal connection 42, one end of a generally inverted U-shaped element 44, which is partially secured at its opposite end to a pivotal connection 46 located in a lateral extension 48 of the second L-shaped element 16, and one end of a second clamp jaw 50. The opposite end of jaw 50 has means thereon, notably a hook 52 to engage the cutter linkage 26 at a point dictated by the size of the article to be cut via a protruding pin 54. In most instances, the second clamp jaw 50 generally is shorter than the first clamp jaw 22 as shown in Fig. 1.

Intermediate the ends of the jaws 22 and 50 is a tie plate 56, or, preferably, two such tie plates 56 on opposite sides, serving to provide two spaced pivots 58 and 60 about which the clamp jaws pivot in response to actuation of the power levers 10 and 14 about pivot 18. Also provided intermediate the ends of the jaws 22 and 50 are meshing teeth, e. g., saw teeth 62 and 64, respectively, which serve to prevent longitudinal motion therebetween when cutting pressure is applied.

In practice, the apparatus of this invention is operated by applying pressure to force the power levers together, thus forcing apart the pivots 42 and 20 and thereby pivoting, with greatly increased force, clamp jaws 22 and 50 about pivots 58 and 60 with the result that a high degree of tension is applied to the cutter assembly 26 disposed about the pipe to be cut. This tension transmits a circumferentially-uniform, radially-directed pressure which effects a clean, sharp cutting of the pipe.

To adjust the apparatus, power lever 14 is rotated about its longitudinal axis to move slotted element 32 longitudinally which, in turn, alters the effective spacing of clamp jaws 22 and 50, thereby adjusting the apparatus to facilitate cutting articles of varying sizes. It will be appreciated, thus, that this invention permits rapid and easy hand adjustment of the cutter in use to cut articles of widely varying sizes simply by rotating one of the handles about its longitudinal axis.

The cutter assembly referred to generally at 26 comprises a plurality of links 110 supporting uniformly-spaced cutters 112 assembled into a non-extensible chain or linkage by pins 114 extending through said cutters and links to permit engagement thereof by the hook 52 of element 50, said assembly adapted when disposed about an article to be cut, e. g., pipe 27, to effect cutting thereof while stationary with respect thereto when tension is applied to said cutter assembly by the clamp jaws 50 and 22.

The various cutters, clamp jaws and other elements described herein may be formed of suitable metal, alloy, or other high strength material capable of transmitting pressure to the pipe or other article to be cut without cracking, shattering or too rapid dulling. Illustrative of suitable materials are various high strength steels including high carbon steels and low or medium carbon steels. It will be understood, of course, that as a practical matter the particular steel employed in forming the cutters and cutting edges is dictated by a consideration of the hardness, brittleness, availability, etc. The angle included between the surfaces defining a cutting edge generally may be varied also, a typically preferred angle being about 45°.

It is to be understood that although the invention has been described with specific reference to particular embodiments thereof, it is not to be so limited, since changes and alterations therein may be made which are within the full intended scope of this invention as defined by the appended claims.

What is claimed is:

1. Apparatus for cutting a hollow article, said apparatus including at least one cutter having a cutting edge adapted while stationary with respect to said article to effect cutting thereof via application of radially-directed pressure, there being connected to said cutter a compound leverage pressure clamp comprising, in combination, a first and second power lever, each pivotally connected at one end at a first common pivot, a first clamp jaw pivotally secured at one end to said first power lever adjacent said first common pivot and at its opposite end to said cutter, a second clamp jaw having means at one end to engage said cutter and at its opposite end pivotally and slidably engaged in a slotted element adjustably secured to said second power lever adjacent said first common pivot, said second power lever being rotatable about its longitudinal axis thereby to transmit longitudinal movement to said slotted element, a lock element connected to said second clamp jaw in the slot of said slotted element, and to said second power lever, at least one tie plate pivotally joining said clamp jaws, and means to prevent longitudinal movement therebetween.

2. Apparatus for cutting a hollow article, said apparatus including at least one cutter having a cutting edge adapted while stationary with respect to said article to effect cutting thereof via application of radially-directed pressure, there being connected to said cutter a compound leverage pressure clamp comprising, in combination, a first member pivotally secured at a first common pivot to a second member, a power arm secured to said first member, said second member having a longitudinal opening therethrough, said opening being threaded for a portion of its length, and having therein a rotatable power arm secured to and adapted to move longitudinally, a non-rotatable element extending from said second member and having an inclined slot disposed at an acute angle with respect to said rotatable power arm, a lock element pivotally secured to said second element at one end and at its opposite end in said slot, a first clamp jaw pivotally secured to said first member adjacent said first common pivot at one end and to said cutter at the opposite end, a second clamp jaw connected at one end to said lock element in a pivotal connection slidably disposed in said slot, and having means at its opposite end to engage said cutter, a rigid tie plate joining said clamp jaws via pivotal connection therein and means to prevent longitudinal movement therebetween.

3. Apparatus for cutting a hollow article, said apparatus including at least one cutter having a cutting edge adapted while stationary with respect to said article to effect cutting thereof via application of radially-directed pressure, there being connected to said cutter a compound leverage pressure clamp comprising, in combination, a first L-shaped member pivotally secured at a first common pivot to a second L-shaped member, a power arm secured to said first L-shaped member, said second L-shaped member having a longitudinal opening therethrough, said opening being threaded for a portion of its length and having therein a rotatable power arm secured to and adapted to move longitudinally, a non-rotatable element extending from said second L-shaped member and having an inclined slot disposed at an acute angle with respect to said rotatable power arm, a lock element pivotally secured to said second L-shaped element at one end and at its opposite end in said slot, a first clamp jaw pivotally secured to said first L-shaped member adjacent said first common pivot at one end and to said cutter at the opposite end, a second clamp jaw connected at one end to said lock element in a pivotal connection slidably disposed in said slot, and having means at its opposite end to engage said cutter, a rigid tie plate joining said clamp jaws via pivotal connection therein and means to prevent longitudinal movement therebetween.

4. Apparatus according to claim 1 wherein said cutter comprises a non-extensible linkage including a plurality of cutting edges.

5. Apparatus according to claim 4 wherein said cutting edges comprise arcuate edges.

6. Apparatus according to claim 1 wherein said cutter comprises a non-extensible linkage provided with a plurality of circular cutting edges.

7. Apparatus according to claim 1 wherein a plurality of cutters are employed, said cutters being connected into a linkage adapted to surround said article and while stationary to apply substantially uniformly distributed radial pressure sufficient to cut said article without rotation of said apparatus about said article.

No references cited.